United States Patent
Cao et al.

(10) Patent No.: US 8,100,226 B2
(45) Date of Patent: Jan. 24, 2012

(54) POROUS NONWOVEN SCRIMS IN ACOUSTICAL PANELS

(75) Inventors: Bangji Cao, Naperville, IL (US);
Gregory Palm, Beavercreek, OH (US);
Weixin D. Song, Lake Forest, IL (US)

(73) Assignee: USG Interiors, Inc., Chicago, IL (US)

( * ) Notice: Subject to any disclaimer, the term of this patent is extended or adjusted under 35 U.S.C. 154(b) by 0 days.

(21) Appl. No.: 12/966,051

(22) Filed: Dec. 13, 2010

(65) Prior Publication Data
US 2011/0147119 A1    Jun. 23, 2011

Related U.S. Application Data

(60) Provisional application No. 61/289,140, filed on Dec. 22, 2009.

(51) Int. Cl.
*E04B 1/82* (2006.01)
(52) U.S. Cl. ............ 181/292; 181/284; 181/286
(58) Field of Classification Search .......... 181/292, 181/284, 286
See application file for complete search history.

(56) References Cited

U.S. PATENT DOCUMENTS

| | | | |
|---|---|---|---|
| 4,283,457 A | 8/1981 | Kolsky et al. | |
| 5,674,594 A * | 10/1997 | Sensenig | 428/206 |
| 5,824,973 A | 10/1998 | Haines et al. | |
| 6,296,075 B1 * | 10/2001 | Gish et al. | 181/290 |
| 6,877,585 B2 | 4/2005 | Tinianov | |
| 7,033,963 B2 * | 4/2006 | Felegi et al. | 442/44 |
| 7,320,739 B2 | 1/2008 | Thompson, Jr. et al. | |
| 2005/0178500 A1 * | 8/2005 | Chevrette et al. | 156/291 |
| 2005/0217932 A1 * | 10/2005 | Woodman et al. | 181/290 |
| 2007/0102237 A1 * | 5/2007 | Baig | 181/290 |
| 2007/0186493 A1 * | 8/2007 | Baig | 52/144 |
| 2010/0146887 A1 * | 6/2010 | Wiker et al. | 52/232 |

FOREIGN PATENT DOCUMENTS

| | | |
|---|---|---|
| EP | 0605784 B1 | 6/1997 |
| JP | 09-314753 A | 12/1997 |
| JP | 10-159320 A | 6/1998 |
| KR | 10-2002-0035818 A | 5/2002 |

OTHER PUBLICATIONS

Notification of Transmittal of the International Search Report and the Written Opinion of the International Searching Authority, or the Declaration, International Search Report dated Aug. 18, 2011; Written Opinion of the International Searching Authority dated Aug. 18, 2011.

* cited by examiner

*Primary Examiner* — Forrest M Phillips
(74) *Attorney, Agent, or Firm* — Pearne & Gordon LLP

(57) ABSTRACT

An acoustical building panel and method of manufacturing it are disclosed. Embodiments of the panel include a porous nonwoven scrim, a coating deposited on the scrim, a base mat, and an adhesive deposited on either the base mat or the scrim in a discrete form such as in droplets. Embodiments of the method of manufacture include steps of perforating the base mat, applying the adhesive to the base mat in the discrete form, laminating the scrim onto the base mat, and applying the coating to the scrim surface.

15 Claims, 2 Drawing Sheets

POROUS NONWOVEN SCRIMS IN ACOUSTICAL PANELS

This application claims the priority of U.S. Provisional Application No. 61/289,140, Filed Dec. 22, 2009.

FIELD OF THE INVENTION

This invention relates to acoustical panels used in the building industry.

BACKGROUND OF THE INVENTION

Acoustical panels, tiles or walls fall into the category of building products which impart architectural values, acoustical absorbency and attenuation, and/or utilitarian functions to building interiors. Commonly, acoustical panels are used in public areas that require noise control such as in office buildings, department stores, hospitals, hotels, auditoriums, airports, restaurants, libraries, classrooms, theaters, cinemas, and some residential buildings.

Acoustical panels must demonstrate a certain level of sound absorption to be effective in controlling noise in buildings. Sound absorption is typically measured by its Noise Reduction Coefficient (NRC). A detailed method of measuring NRC is outlined in ASTM C423. NRC is represented by a number between 0 and 1.00, which indicates the percentage of sound it will absorb. For example, an acoustical panel having an NRC value of 0.60 will absorb 60% and deflect 40% of the sound. Another method to test the sound absorption property is estimated NRC (eNRC), which is measured using a smaller sample size via an impedance tube as detailed in ASTM C 384. The estimated NRC is calculated by obtaining the average normal incidence sound absorption coefficient obtained at the frequencies of 250, 500, 1000 and 1600 Hz and multiplying it by 1.6.

In the building industry, panel products that are very effective in controlling noise are said to have a high NRC. High NRC panels successfully reduce a good amount of reverberation within open spaces. As such, it is desirable to use high NRC panels in buildings that are designed to have large rooms or other open spaces.

Several characteristics of acoustical panels and related testing methods are governed by industry standards and building codes. One critical requirement for acoustical panels is the ability to remain substantially rigid or sag-free in a humid environment. A standard test for determining sag of a panel product under various conditions of humidity exposure is described in ASTM C367. Briefly, ceiling panels having a size of 2 ft. by 4 ft. are laid in a test frame as is known in the art. They are then exposed to a climate having 104° F. and 95% relative humidity for 12 hours, followed by a climate having 70° F. and 50% relative humidity for another 12 hours. Three such cycles are repeated. At the end of three cycles, the total moisture-induced sag is recorded as the distance in inches that the center of the panel sags downwards compared to the edges that are held stationary by the test frame. The recorded distance indicates the sag performance of the acoustical panel.

Currently, most acoustical panels or tiles are made from aqueous slurry that contains fibers, fillers, and binders. The manufacture of these panels is primarily based on a water-felting process. In a water-felting process, the base mat is formed in a way that is similar to papermaking. This process is described, for example, in U.S. Pat. No. 5,911,818. Briefly, a slurry containing dilute aqueous dispersions of mineral wool and light weight aggregate is delivered onto a moving foraminous wire of a Fourdrinier-type mat forming machine. Water is drained by gravity from the slurry and then optionally dewatered by means of vacuum suction and pressing. Such dewatered wet base mats are dried in a heated convection oven or kiln to remove the residual moisture. The dried base mats are further subjected to finishing operations in order to form panels with acceptable size, appearance, and acoustical properties to end-users. These finishing operations typically include surface grinding, sawing, perforation/fissuring, roll/spray coating, and edge cutting. Due to its speed and efficiency, the water-felting method is currently the manufacturing process of choice.

A typical base mat of an acoustical panel comprises inorganic fibers, cellulosic fibers, fillers, and binders. As is well known in the industry, inorganic fibers are either mineral wool (inter-changeable with slag wool, rock wool, stone wool) or fiber glass. These inorganic fibers are stiff and are used to provide bulk and porosity to the base mat. Cellulosic fibers such as paper fibers, on the other hand, are used as structural elements and help provide both wet and dry strength to the base mat. The strength is believed to be due to the formation of countless hydrogen bonds among the hydrophilic cellulosic fibers and the various ingredients in the base mat.

A typical base mat binder used is starch. Normally, starches used in base mats are unmodified, uncooked starch granules that are uniformly dispersed in water to form a slurry. Once heated, the starch granules become "cooked" and bind the other base mat ingredients. Starch is typically required for flexural strength, which is measured as modulus of rupture (MOR). Starch is also typically necessary to impart hardness and rigidity to a panel.

In certain panel formulations, a high concentration of inorganic fibers is desirable. In such formulations, a latex binder is used as the main binding agent. Inorganic base mat fillers can include both light-weight and heavy-weight inorganic materials. Some examples of heavy-weight fillers are calcium carbonate, clay, and gypsum. An example of a light-weight filler is expanded perlite. The primary function of fillers is to provide flexural strength and hardness, but other functions are possible depending on the filler material chosen. As used in this disclosure, it is understood that fillers do impart more properties than simply providing mass, strength, hardness or bulk to a product.

Because of the amount of hydrophilic materials (such as cellulosic fibers or starch, for example) used in typical acoustical panel base mats, the finished panels are susceptible to humidity changes in the environment. When the humidity level increases in the environment, the hydrophilic components in the panel absorb moisture from the surrounding air. The absorbed water molecules loosen and break the hydrogen bonds that exist between the cellulosic fibers, starch, mineral wool, fillers, and other materials in the mat. The resulting reduced number of hydrogen bonds results in reduced internal strength. Consequently, the panel will begin to sag under its own weight. A panel could experience many cycles of high and low humidity in its lifetime of usage, and each cycle will introduce additional sag. Increased temperatures speed up the sagging process.

The accumulation of sag eventually leads to an objectionable visual appearance which decreases the aesthetic appeal of a room. As a result, consumers must regularly replace sagged panels. Therefore, an acoustical panel that can resist the humidity changes in the environment and that does not exhibit a visible sag even in a highly humid environment would be desirable.

Currently, in the building products market, acoustical panels that have laminated nonwoven scrims (also known in the art as facings, facers, veils and tissues, among other terms) normally include base mats made of fiberglass or of mineral wool. One example of laminated fiberglass panels is Halcyon™ brand panels made by USG Interiors, Inc. of Chicago, Ill., United States of America (USG). An example of laminated mineral wool panels is Mars™ brand panels also made by USG. The base mats of both of these types of acoustical panels are formed by binding the fiberglass or mineral wool, as the case may be, with a thermal setting binder or a latex.

More than 80% by weight of these base mats are either fiber glass or mineral wool, and these inorganic fibers are relatively insensitive to humidity. That is, such fibers are not hydrophilic, so they do not absorb an appreciable amount of water or moisture from the air. In addition, thermal setting binders such as urea-formaldehyde or phenol-formaldehyde, and latex binders such as acrylic styrene are typically used as components in these base mats, and such components are humidity-resistant. The aforementioned fibers and binders when used together in base mats impart excellent performance characteristics in terms of sag resistance.

When manufacturing fiberglass or mineral wool panels, a scrim is normally affixed to the panel to enhance its aesthetic appeal to customers. Many desirable acoustical panels have a smooth surface with a high light-reflectance value (LRV). As is known in the art, the light reflectance value is simply the percentage of light that is reflected by the surface that is being tested. For example, an acoustical panel that reflects 85% of the light that is shined upon it has a LRV of 85. Typically, a desirable acoustical panel has a LRV of about 85 or more.

After the scrims are laminated onto a panel, the scrims typically have a decorative coating sprayed onto them to increase brightness or overall light reflectance. The coating may be aqueous or non-aqueous. In order to reduce the amount of coating required to reach a specific LRV, scrims used in producing acoustical panels have a relatively high specific air flow resistance and contain a substantial amount of pigments. The use of coatings increases light reflectance and aesthetic appeal, but a significant loss of acoustical absorption by the laminated panels sometimes results. This is because, among other reasons, the coatings can block the pores in the panel and otherwise act to reflect sound rather than allow sound to enter into the panel where it can be dispersed. It would be desirable if one could reduce the extent of loss of acoustical absorption.

Another desirable characteristic of acoustical panels with scrims is that the scrim should not peel off or otherwise become delaminated from the base mat of the panel. To measure how well a scrim is attached to a substrate, peel strength is determined according to ASTM D 903. In this disclosure, the peel strength is tested with a modified ASTM D 903 procedure. The main modifications are that the scrim is separated from the substrate at a 45° angle instead of a 180° angle, and the sample size is 4 inches by 6 inches instead of 1 inch by 12 inches. The sample in the modified version is peeled in the 6 inch direction.

Another important property that a desirable scrim should possess is sufficient tensile strength. The tensile strength of nonwoven scrims is measured according to ASTM D 828 on samples comprising 2 inch strips of the scrim being tested. The most important attribute of a scrim, however, is its air flow resistance. Air flow resistance is a measure of porosity. Scrim porosity is essential to achieving sound absorption in the base mat. This is because a porous scrim allows sound to pass through it rather than reflecting the sound back into the room in which the ceiling panel with the scrim is installed.

In this disclosure, the specific airflow resistance of various scrims was determined using a variation of ASTM C 522, "Standard Test Method for Airflow Resistance of Acoustical Materials." The slight modification was made to the test fixture to hold the scrim as shown in FIG. 1.

As shown in FIG. 1, the scrim being tested is clamped between two closed-cell foam or solid rubber gaskets in the test fixture. The gaskets provide a mechanism to clamp and constrain the scrim as well as prevent air leakage around the scrim and within the test fixture. Once the scrim is clamped in place between the gaskets, air is passed through the scrim at a known flow rate, determined using a standard air flow meter. An air flow rate below 50 mm/s is used such that turbulent air flow is avoided as specified in ASTM C 522. The differential pressure of the air behind the scrim (i.e., back pressure) and the atmosphere is then recorded at the given flow rate. The differential pressure (P), air flow rate (U) and cross-sectional area of the scrim exposed to the flow of air (S) is used to calculate the specific airflow resistance (r) of the scrim per the equation outlined in ASTM C 522, namely r=SP/U.

SUMMARY OF THE INVENTION

Due to the presence of hydrophilic components such as cellulosic fibers and starch, many acoustical panels exhibit poor sag resistance in humid environments. In embodiments of the present invention, scrims of low air flow resistance and high porosity are used to make laminated acoustical panels to improve the humidity sag performance of the panel and to reduce the loss in sound absorption caused by adhesives and coated scrim.

The basic premise of embodiments of the present invention is that a panel is under tension at its lower surface when hanging on a grid with its edges. By affixing a rigid scrim or veil or facing to the lower surface, the panel would be able to sustain tension and resist downward sag. However, a determining factor of whether a scrim can help the sag performance is the bonding between the scrim and base mat. A poorly bonded scrim cannot restrict the relative movement between the scrim and the base mat to which it is affixed. Even a slight relative movement in horizontal direction could allow a panel to have significant movement in the vertical direction, that is, sag. Therefore, the key is to firmly bond the scrim to the base mat and restrict the relative movement between a scrim and a base mat, making the scrim an integral part of the laminated panel.

In accordance with embodiments of the present invention, a scrim is first attached to a base mat through a discrete layer of adhesives. The adhesives has to be in a discrete form because a continuous film would plug the perforations in the base mats and seal the air passage that allow sound absorption. However, a discrete layer of adhesives is not sufficient to completely restrict the relative movement between a scrim and a base mat in the horizontal direction. In addition, many glues and adhesives are viscoelastic, making the bond stretchable. For these reasons, the choice of glues and adhesives is an important consideration. After the scrim is affixed, the panel is then finished with a coating or paint sprayed onto its surface.

Porosity of a scrim plays a critical role to bond the scrim to a base mat. A porous scrim has a low specific air flow resistance, which allows coatings to penetrate or wick through the scrim and onto the base mats. Once dried, these coatings provide additional bonding between a base mat and scrim. Since coatings contain a large amount of inorganic pigments, the bonding provided by coatings is relatively rigid. Thus, the bonding can restrict the relative movement between scrim and base mat, making the scrim an integral part of a laminated ceiling panel. On the other hand, a dense scrim retains most coatings or paint on its surface. The coatings on the surface cannot contribute to the bonding between a base mat and a scrim. A laminated panel with a dense scrim relies solely on adhesives to provide bonding. Such a panel will have a similar sag performance to base mats without scrims.

In accordance with embodiments of the present invention, a porous fiberglass scrim renders a 40 to 400% increase in scrim peel strength after laminating and coating. The resultant laminated acoustical panel would have a total moisture-induced sag of less than 0.3 inches (for panels with 2 ft. width and 4 ft. length) in a humidity chamber after three cycles alternating between 75° F./50% relative humidity (RH) and 104° F./95% RH.

In accordance with embodiments of the present invention, the use of scrims with low specific air flow resistance and high porosity reduce the loss in acoustical absorbency caused by glue/adhesives and coating/paint. The laminated acoustical panels have an eNRC of at least 0.45 and NRC of at least 0.5.

BRIEF DESCRIPTION OF THE DRAWINGS

The features and advantages of embodiments of the present invention will become apparent by referring to the accompanying drawings when read in conjunction with the detailed description of the invention. The dimensions in the drawing are for the purpose of exemplification, and should not be interpreted as a limitation to physical dimensions of the embodiment.

DETAILED DESCRIPTION OF THE PREFERRED EMBODIMENT

Figure 1:
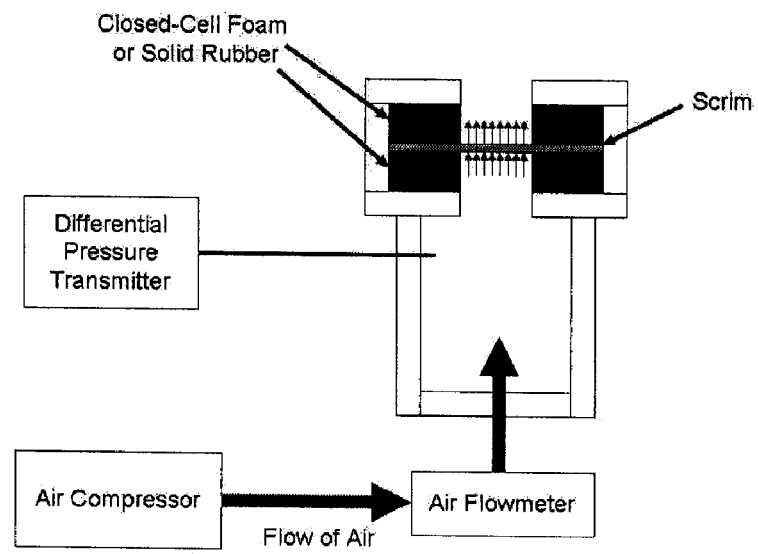
FIG. 1 is a schematic drawing of the scrim specific airflow resistance test setup described herein.
Figure 2:
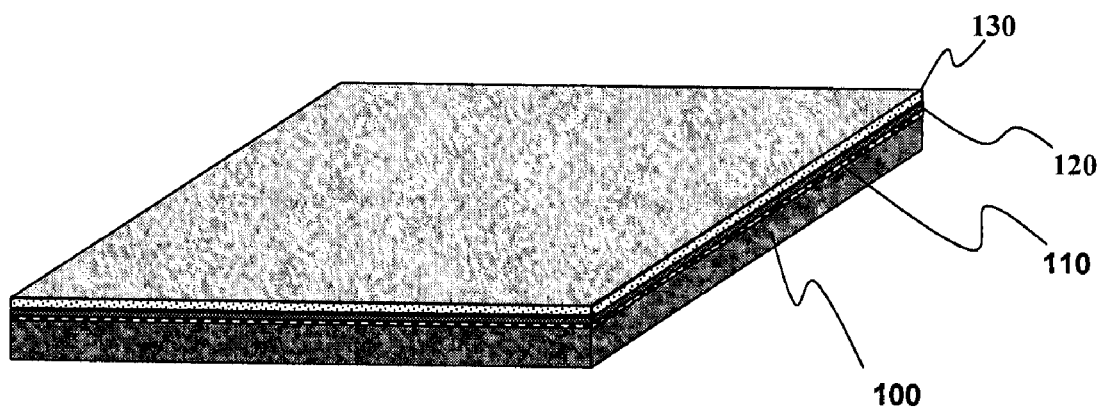
FIG. 2 illustrates an assembly of a laminated acoustical panel, which comprises a base mat or substrate 100, a discrete layer of adhesives 110, a porous scrim or veil or facing or facer 120, and a surface coating or paint 130.
Figure 3:
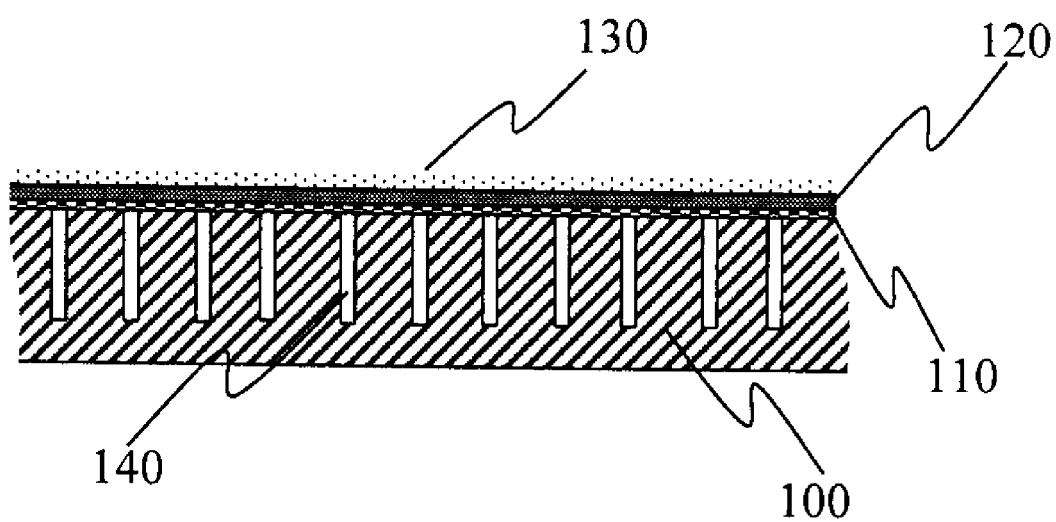
FIG. 3 illustrates the cross-sectional view of a piece of finished acoustical ceiling tile, in which perforations 140 in a base mat are shown.

The method and product described herein are intended to apply to acoustical panels used as building materials. More specifically, the panels can be used as acoustical ceiling or wall panels or tiles. The detailed description of the invention is one embodiment of the invention, and it should not be construed to limit the scope of the invention in any way.

In accordance with embodiments of the present invention, base mats or substrates are made from a liquid slurry that contains a mixture of fibers, fillers, and binders employing methods known in the art. The fibers comprise mineral wool and cellulosic fibers; the fillers comprise expanded perlite, calcium carbonate, or clay; the binders comprise starch granules.

As known in the art, a homogeneous slurry containing the above-mentioned ingredients transported using a hydraulic pump from a vat to a headbox, which is placed in an elevated position so that a steady and constant flow of slurry is supplied to a mat-forming machine. The slurry is then deposited onto a moving foraminous wire to form a wet base mat. Water is drained from the wire by gravity. Then additional water is removed by applying a low force vacuum (vacuuming at a rate of about 1 to about 5 inches Hg) under the wire that carries the wet base mat. The base mat may be further dewatered by pressing the mat between two rolls. Yet more water can optionally be removed by applying a relatively high vacuum (vacuuming at a rate of about 8 to about 20 inches Hg) under the wire that carries the mat. The rest of the water in the wet base mat is evaporated in an oven or kiln.

Afterwards, the formed base mats are slit into various sizes. The surfaces of the base mats are ground relatively smooth before a primer coating is optionally applied to the surface. The purpose of the primer coating is to provide a good base on which glue can more easily adhere and to increase the light-reflectance of the mats.

Subsequently, the base mats are punched and fissured to achieve desired acoustic absorbency. The punching operation provides multiple perforations on the surface of the mat at a controlled depth, size, and density (number of perforations per unit area). As known in the art, punching operations are carried out by pressing a plate equipped with a predetermined number of needles onto a base mat. Fissuring imparts indentations of unique shapes onto the surfaces of the base mats. Fissuring operations are carried out with a roll device that has a circumference upon which the complementary features or patterns are placed. Both punching and fissuring open the plane surface and the internal structure of the base mats, thereby allowing air and sound waves to move in and out of the base mat structure.

The next step in the process is to deposit adhesives onto the base mats. The adhesive can be sprayed or coated with a gravure roll onto the base mats. The adhesives on the base mat must be in a discrete or perforate form, for example, in the form of droplets so that the mats do not have a continuous, imperforate sheet of adhesive film on them. A continuous film of adhesives on the base mat is undesirable as discussed above. The amount of adhesives must be optimized to reduce its impact on acoustic absorbency while providing sufficient bonding to base mats. Even with an optimum amount of adhesives deposited in a discrete manner, a loss of 0.02 to 0.07 in eNRC or NRC is expected. In accordance with embodiments of the present invention, the total amount of adhesives (containing water or solvent) applied to a base mat is in the range of about 0.5 to about 8 grams/ft$^2$, and is preferably in the range of about 1 to about 4 grams/ft$^2$.

Alternatively, adhesives can be applied to a non-woven scrim, such as fiberglass scrim, instead of on the base mats before lamination. The amount of the adhesives used and the manner that it is deposited on the scrim are similar to the methods described for base mats. After application of adhesive, the non-woven, porous, fiberglass scrim is laminated onto the base mats.

The objectives of lamination are to improve the sag performance in humid environment and to reduce the loss in NRC and eNRC caused by dense scrims. As mentioned previously, the specific air flow resistance of a scrim has a significant impact on the properties of a laminated acoustical panel. In general, the air flow resistance is dependent upon basis weight, fiber coarseness, and the amount of binder and filler applied in a scrim. Scrims become dense and have a high specific air flow resistance when a scrim is composed of fine glass fibers and contains a relatively high amount of binder; scrims become porous and have a low specific air flow resistance when a scrim is composed of coarse glass fibers and contains a relatively low amount of binder.

In accordance with embodiments of the present invention, scrims of high porosity are required to render a laminated acoustical panel of high peel strength, high sag resistance and low loss in acoustical absorbency. Although it appears counterintuitive, a scrim in and of itself does not significantly affect acoustical absorption. In fact, affixing any plain scrim to a base mat would increase eNRC slightly. However, the application of glue and coating would reduce acoustical absorption considerably, although the extent of reduction varies with different scrims. With relatively porous scrims (specific air flow resistance of between about 10 to about 25 Rayls [Pa·s/m]), the average loss in eNRC or NRC due to glue and coating is about 0.03 to 0.06. On the other hand, with relatively dense scrims (specific air flow resistance of between about 25 to about 100 Rayls), the average loss in eNRC or NRC due to glue and coating is about 0.05 to 0.10. In order to minimize the loss in acoustical absorbency, a scrim with less than about 25 Rayls of specific air flow resistance is desired.

The application of coating or paint onto a porous scrim can significantly improve scrim peel strength. The increase in peel strength ranges from about 40 to about 400%. However, this increase is dependent upon the scrim porosity. There is little or no improvement in peel strength when the specific air flow resistance of scrims is higher than 35 Rayls. By examining photographs of peeled scrims through transmitted light, it is revealed that dense scrims have a great amount of coating retained on the scrim surfaces. Porous scrims made with coarse fibers, on the other hand, retain much less amount of coatings on their surfaces. A substantial amount of coating deposits onto or wicks into the base mats. Once the coating is transmitted into the base mat, the coating acts as a sealant to bond the scrim to the base mats, improving scrim peel strength. For dense scrims made with fine fibers, the coatings cannot penetrate the scrim surface as greatly so they cannot contribute to the improvement in peel strength. In accordance with embodiments of the present invention, a scrim with a specific air flow resistance less than 30 Rayls is laminated onto base mats to develop a significant improvement in peel strength by coatings.

The basic principle to improve sag resistance by laminating a rigid scrim made from a material such as fiberglass onto a base mat is that the face of the panel is under tension during sagging, and a rigid scrim would be able to sustain the tension and restrict sagging. However, as is unexpectedly revealed through experimentation with certain embodiments of this invention, how well a scrim is actually bonded to a base mat has a direct impact on the humidity sag performance of a laminated acoustical panel. Surprisingly, there is actually an inversely linear relationship between the peel strength and humidity sag of a laminated panel until the coating no longer contributes to the peel strength as a result of impermeability of the scrim.

If there is no coating or if the coating is mostly on the surface of a scrim due to low porosity, the bonding between a scrim and a base mat has to rely solely on adhesives. But the amount of adhesives that can be applied is limited in order to prevent plugging of perforations in base mats. In addition, most adhesives are visco-elastic, making the bonding stretchable. Therefore, glue alone will not be able to restrict the relative movement between the scrim and base mat during sagging. Even a slight relative movement between a scrim and base mat would result in a significant vertical movement from the panel plane, that is, sag.

When coatings penetrate through a porous scrim, additional bonding between the scrim and base mat is formed. Coatings or paint contain a high amount of pigment compared to glues. The bonding provided by coatings/paint is rigid. Thus, the bonding can restrict the relative movement between scrim and base mat, making the scrim an integral part of a laminated ceiling panel. A firmly bonded scrim can improve the humidity sag performance of laminated panels. Since a low amount of humidity sag is highly desirable, the use of a porous scrim would add a significant advantage to laminated acoustical panels.

In order to have a total sag movement less than 0.3 inches (for panels with 2 ft. width and 4 ft. length) after three cycles in a humidity chamber alternated between 75° F./50% RH and 104°/95% RH, the scrim must possess a specific air flow resistance less than 30 Rayls, and a tensile strength of at least 10 lbf per two-inch width in either direction.

The novel use of scrims with low specific air flow resistance and high porosity claimed herein would reduce the loss in acoustical absorbency caused by adhesives and coatings. The laminated acoustical panel would have an eNRC of at least about 0.45 and NRC of at least about 0.5.

EXAMPLES

Example 1

A base mat comprising mineral wool, newsprint fibers, expanded perlite, starch, and clay was ground to have a relatively smooth surface and coated with a primer. The base mat was then perforated as described above, the perforations having a depth of about 0.4 inches. The perforated base mat had and eNRC of 0.58. A commercially available glue XR-3025 manufactured by HB Fuller of St. Paul, Minn. was sprayed onto said base mats at 4.5 grams/ft$^2$.

A fiberglass scrim was then laminated onto the base mats. The scrim was purchased from Owens Corning, Toledo, Ohio. The scrim had a specific air flow resistance of 41.4 Rayls, a basis weight of 127.7 g/m$^2$, a thickness of 0.020 inches (0.5 mm), a tensile strength of 45.7 lbf/2-inch (200 N/50-mm) in machine direction, and a tensile strength of 42.1 lbf/2-inch (184 N/50-mm) in cross machine direction.

After lamination, the surface was sprayed with a coating. The coating contained about 80% pigments and 20% latex based on total solids content. It had a solids content of about 50%. The coating was applied at about 24 grams/ft$^2$. After the coating was applied, the peel strength was measured to be 325 grams per 4-inch width. The resultant laminated panel had an eNRC of 0.49 and a humidity sag of 0.729 inches. The panel without scrim had a humidity sag of 0.719 inch. The loss in eNRC was about 0.09.

The example shows that with a relatively dense scrim, there is no improvement in humidity sag and scrim peel strength is low. The eNRC decreased significantly.

Example 2

A base mat comprising mineral wool, newsprint fibers, expanded perlite, starch, and clay was ground to have a relatively smooth surface and coated with a primer. The base mat was then perforated as described above, the perforations having a depth of about 0.4 inches. The perforated base mat had an eNRC of 0.46. The commercially available glue XR-3025 mentioned above was sprayed onto said base mats at 4.8 grams/ft$^2$.

A fiberglass scrim was then laminated onto the base mats. The scrim (sold under the product name Ultra Matt®) was obtained from GAF-Elk Corp. of Ennis, Tex. The scrim had a specific air flow resistance of 15.3 Rayls, basis weight of 76.7 g/m$^2$, a thickness of 0.023 inch (0.58 mm), a tensile strength of 29.8 lbf/2-inch (130 N/50-mm) in machine direction, and a tensile strength of 26.7 lbf/2-inch (117 N/50-mm) in cross machine direction.

After lamination, the surface was sprayed with a coating. The coating contained about 80% pigments and 20% latex based on total solids content. It had a solids content of about 50%. The coating was applied at about 24 grams/ft$^2$. Before coating, the peel strength was measured at 444 grams/4-inch width. After coating, the peel strength was 1598 grams per 4-inch width. The resultant laminated panel had a humidity sag of 0.076 inch, an eNRC of 0.40, and a NRC of 0.48. The panel without scrim had a humidity sag of 0.372 inch.

This example shows that with a relatively porous scrim, the peel strength was increased by 3.6 times after coating is applied, the humidity sag was reduced drastically, and loss in eNRC was reduced to 0.06.

Example 3

A base mat comprising mineral wool, newsprint fibers, expanded perlite, starch, and clay was ground to have a relatively smooth surface and coated with a primer. The base mat was then perforated as described above, the perforations having a depth of about 0.4 inches. The perforated base mat had an eNRC of 0.46.

The glue XR-3025 was sprayed onto the said base mats at 4.8 grams/ft$^2$. A fiberglass scrim was then laminated onto the base mats. The scrim (sold under the product name Dura-Glass® 7615) was obtained from Johns Manville Corp., Denver, Co. The scrim had a specific air flow resistance of 12.2 Rayls, a basis weight of 60.9 g/m$^2$, a thickness of 0.018 inch (0.46 mm), a tensile strength of 41.4 lbf/2-inch (181 N/50-mm) in machine direction, and a tensile strength of 35.2 lbf/2-inch (154 N/50-mm) in cross machine direction.

After lamination, the surface was sprayed with a coating containing about 80% pigments and 20% latex based on total solids content. It had a solids content of about 50%. The coating was applied at about 24 grams/ft$^2$.

Before coating, the peel strength was 412 grams/4-inch width. After coating, the peel strength was 1597 grams per 4-inch width. The resultant laminated panel had a humidity sag of 0.053 inch, an eNRC of 0.39, and NRC of 0.47. The panel without scrim had a humidity sag of 0.372 inches.

This example shows that with a relatively porous scrim, the peel strength was increased by 3.9 times after coating is applied, the humidity sag was reduced drastically, and loss in eNRC was reduced to 0.07.

Example 4

A base mat comprising mineral wool, newsprint fibers, expanded perlite, starch, and clay was ground to have a relatively smooth surface and coated with a primer. The base mat was then perforated as described above, the perforations having a depth of about 0.4 inches. The perforated base mat had an eNRC of 0.46.

The commercially available glue XR-3025 was sprayed onto said base mats at 4.8 grams/ft$^2$. A fiberglass scrim was then laminated onto the base mats. The scrim (sold under the product name GFT-25) was obtained from Ahlstrom Corp. of Kotka, Finland. The scrim had a specific air flow resistance of 23.0 Rayls, a basis weight of 50.8 g/m$^2$, a thickness of 0.013 inch (0.33 mm), a tensile strength of 22.6 lbf/2-inch (99 N/50-mm) in machine direction, and a tensile strength of 15.3 lbf/2-inch (67 N/50-mm) in cross machine direction. After lamination, the surface was sprayed with a coating containing about 80% pigments and 20% latex based on total solids content. It had a solids content of about 50%. The coating was applied at about 24 grams/ft$^2$.

Before coating, the peel strength was 329 grams/4-inch width. After coating, the peel strength was 1596 grams per 4-inch width. The resultant laminated panel had a humidity sag of 0.102 inches, an eNRC of 0.37, and an NRC of 0.43. The panel without scrim had a humidity sag of 0.372 inches.

This example shows that with a medium porosity scrim, the peel strength was increased by 4.9 times after coating is applied, the humidity sag was reduced significantly, and loss in eNRC was 0.09, similar to the results from the dense scrim.

The following Table 1 illustrates comparative test results showing the relationship between peel strength, specific air flow resistance and humidity sag for the above examples.

TABLE 1

Test results indicated that when the scrim as applied in accordance with the invention had a low specific airflow resistance value, the scrim peel strength became very high after coating application. Subsequently, the humidity sag with such firmly bonded scrims were significantly reduced.

| Scrim Vendor | Specific Airflow Resistance Pa · sec/m | Basis Weight g/m$^2$ | Thickness inch | Scrim Peel Strength, grams/4 inch | | Humidity Sag, inch | |
|---|---|---|---|---|---|---|---|
| | | | | without coating | with coating | without scrim | with scrim |
| Owens Corning | 41.4 | 127.7 | 0.02 | — | 325 | 0.719 | 0.729 |
| GAF-Elk | 15.3 | 76.7 | 0.023 | 444 | 1598 | 0.372 | 0.076 |
| Johns-Manville | 12.2 | 60.9 | 0.018 | 412 | 1597 | 0.372 | 0.053 |
| Ahlstrom | 23.0 | 50.8 | 0.013 | 329 | 1596 | 0.372 | 0.102 |

We claim:

1. An acoustical building panel comprising:
   a base mat made from a water based composition;
   a porous nonwoven scrim;
   a coating applied to an outer surface of the scrim;
   an adhesive deposited in a discrete or perforate form between the scrim and the base mat;
   the scrim having an air flow resistance of less than about 30 Rayls such that it is sufficiently porous to allow the coating to penetrate the scrim from an outer surface of the scrim to bond to the base mat, the coating increasing a peel strength of the scrim to the base mat over a peel strength made by the adhesive by at least 40%.

2. The panel of claim 1, wherein the base mat contains perforations.

3. The panel of claim 1, wherein the scrim has a tensile strength of at least about 10 lbf per two-inch width.

4. The panel of claim 1, wherein the scrim has a basis weight of between about 20 and about 125 grams/m$^2$.

5. The panel of claim 1, wherein the scrim surface coating comprises about 50 percent to about 90 percent inorganic pigments based on total solids content.

6. The panel of claim 1, wherein the scrim surface coating is aqueous and is applied at a rate of about 10 to about 50 grams per square feet.

7. The panel of claim 1, wherein the scrim has a thickness between about 0.005 and 0.020 inches.

8. The panel of claim 1, wherein the discrete form comprises droplets.

9. The panel of claim 1, wherein the panel has a scrim peel strength of at least about 400 grams per four-inch width.

10. The panel of claim 1, wherein the panel has a total sag of less than about 0.5 inches after three cycles in a humidity chamber alternating between 75 degrees Fahrenheit at 50 percent relative humidity and 104 degrees Fahrenheit at 95 percent relative humidity.

11. The panel of claim 1, wherein the panel has an estimated noise reduction coefficient of 0.45 or more.

12. The panel of claim 1, wherein:
the base mat contains perforations;
the scrim has a tensile strength of at least about 10 lbf per two-inch width;
and the scrim surface coating comprises about 50 percent to about 90 percent inorganic pigments based on total solids content.

13. The panel of claim 1, wherein:
the base mat contains perforations.

14. A method of manufacturing the panel of claim 1 comprising steps of:
perforating the base mat;
applying the adhesive to the base mat in the discrete form;
laminating the scrim onto the base mat; and
applying the coating to the scrim surface.

15. An acoustical building panel comprising:
a base mat;
a porous nonwoven scrim; and
a coating applied to an outer surface of the scrim;
wherein the scrim has a specific air flow resistance of less than about 30 Rayls and the scrim surface coating comprises about 50 percent to about 90 percent
inorganic pigments based on total solids content,
the scrim surface coating being effective to wick through and adhere the scrim to the base mat.

* * * * *